United States Patent [19]
Ogura

[11] Patent Number: 6,154,262
[45] Date of Patent: Nov. 28, 2000

[54] BACK LIGHT AND LIQUID CRYSTAL DISPLAY HAVING PROTECTING SHEET WITH PROTRUSIONS

[75] Inventor: Takeshi Ogura, Nara, Japan

[73] Assignee: Sharp Kabushiki Kaisha, Osaka, Japan

[21] Appl. No.: 09/427,480

[22] Filed: Oct. 27, 1999

[30] Foreign Application Priority Data

Oct. 28, 1998 [JP] Japan ................................. 10-306556
Jul. 8, 1999 [JP] Japan ................................. 11-193876

[51] Int. Cl.[7] .................................................. G02F 1/1335
[52] U.S. Cl. ................................................ 349/61; 349/64
[58] Field of Search ............................... 349/61, 62, 58, 349/65, 64; 362/31

[56] References Cited

U.S. PATENT DOCUMENTS

| | | | |
|---|---|---|---|
| 5,584,556 | 12/1996 | Yokoyama et al. | 349/31 |
| 5,596,429 | 1/1997 | Kokawa et al. | 349/67 |
| 5,719,649 | 2/1998 | Shono et al. | 349/65 |
| 5,886,759 | 12/1999 | Mashino et al. | 349/65 |
| 5,990,989 | 11/1999 | Ozawa | 349/61 |
| 6,002,829 | 12/1999 | Winston et al. | 385/146 |

FOREIGN PATENT DOCUMENTS

| | | |
|---|---|---|
| 5-107539 | 4/1993 | Japan . |
| 6-347788 | 12/1994 | Japan . |
| 9-197402 | 12/1994 | Japan . |
| 9-197402 | 7/1997 | Japan . |

*Primary Examiner*—Kenneth Parker
*Assistant Examiner*—Mike Qi
*Attorney, Agent, or Firm*—Nixon & Vanderhye P.C.

[57] ABSTRACT

A reflection sheet and a frame are arranged below a light guide plate having a light collecting effect. A tubular light source is arranged near the end surface (edge) of light guide plate. A reflector is arranged to surround tubular light source. A sheet having the light collecting effect and a sheet having a light diffusing effect are provided above light guide plate. Further, a liquid crystal panel is arranged thereabove. A sheet with protrusions is provided between a lens like grooved surface having the light collecting effect of light guide plate and reflection sheet. Thus, damage is not caused to lens like grooved surface, and lens like grooved surface is prevented from catching reflection sheet. Thus, a liquid crystal display or a back light which prevents a luminous dot phenomenon is provided.

21 Claims, 15 Drawing Sheets

BACK LIGHT AND LIQUID CRYSTAL DISPLAY HAVING PROTECTING SHEET WITH PROTRUSIONS

BACKGROUND OF THE INVENTION

1. Field of the Invention

The present invention relates to back lights and liquid crystal displays, and more particularly to a back light illuminating a liquid crystal panel with light from a back surface and a liquid crystal display provided with the same.

2. Description of the Background Art

Recently, the liquid crystal display has a wide range of applications because of its low power consumption, light weight and small thickness. The liquid crystal display is used, for example, as a display of a household video monitor, industrial machine monitor or personal digital assistant to be fit to use. In particular, the personal digital assistant is increasingly becoming low in power consumption, light in weight, and small in picture-frame and thickness.

FIG. 13 is a cross sectional view showing a conventional structure of a back light illuminating a liquid crystal display with light from a back surface. As shown in FIG. 13, the back light includes a reflection sheet 3 and a frame 8 below a light guide plate 22 uniformly transmitting light. A tubular light source 1 is arranged near the end surface (edge) of light guide plate 22. A reflector 2 is arranged to partially surround tubular light source 1.

Provided above light guide plate 22 are a sheet having a light collecting effect, two sheets 6 having a light diffusing effect (each provided with grooves both in longitudinal and lateral directions), and another sheet 5 having the light collecting effect. A liquid crystal panel 7 is arranged thereabove. Light guide plate 22 is formed of transparent acrylic resin, and its surfaces are all smooth and planar.

It is noted that, the phrases "above light guide plate 22" and "below light guide plate 22" are respectively used to indicate directions toward liquid crystal panel 7 and frame 8 from light guide plate 22.

As the back light has four sheets in total, the overall thickness of the liquid crystal display is large. Further, provision of two sheets 6 having the light diffusing effect makes the liquid crystal display more expensive.

Then, a back light as shown in FIG. 14 has been developed to reduce cost as well as thickness and weight of the liquid crystal display. In the back light, two sheets are eliminated to reduce the overall thickness of the liquid crystal display, so that reduction in thickness and weight is achieved.

FIG. 14 is a cross sectional view showing the structure of the conventional back light illuminating the liquid crystal display from a back surface. FIG. 15A is a cross sectional view showing a structure of frame 8 taken along the line 15A—15A in FIG. 15B.

Referring to FIG. 14, the back light is provided with a reflection sheet 3 and a frame 8 below a light guide plate 4 having a light collecting effect. A tubular light source 1 is arranged near the end surface (edge) of light guide plate 4. A reflector 2 is arranged to partially surround tubular light source 1. Provided above light guide plate 4 are a sheet 5 having the light collecting effect and a sheet 6 having a light diffusing effect. A liquid crystal panel 7 is arranged thereabove.

Instead of having two sheets, light guide plate 4 has at the bottom a lens like grooved surface 4a having the light collecting effect. Further, as shown in FIGS. 15A and 15B, an opening is formed in frame 8 supporting the light guide plate for reduction in weight and thickness and in consideration of a positional relationship with respect to an electric circuit or mechanical part.

In the case of light guide plate 4 having lens like grooved surface 4a at the bottom as described above, lens like grooved surface 4a may be brought into contact with frame 8 or a part supporting light guide plate 4. In such case, lens like grooved surface 4a is damaged, thereby causing irregular reflection. In some cases, reflection sheet 3 may be caught by and fixed to lens like grooved surface 4a. As a result, display by the liquid crystal display becomes white or bright (the phenomenon is called a luminous dot phenomenon).

Furthermore, as shown in FIG. 15A, sharp edge 16 of frame often causes damage to lens like grooved surface 4a, possibly resulting in the luminous dot phenomenon. In particular, if edge 16 is within a liquid crystal display area, sharp edge 16 would more often cause damage to lens like grooved surface 4a, possibly resulting in the luminous dot phenomenon.

In addition, lens like grooved surface 4a of light guide plate 4 may be damaged by a protrusion 20 by a pin or a protrusion by a gate pin, which are caused during manufacture.

SUMMARY OF THE INVENTION

The present invention is made to solve the aforementioned problem. One object of the present invention is to provide a back light preventing damage to a lens like grooved surface of a light guide plate and preventing the lens like grooved surface from catching a member which is in contact with the lens like grooved surface for good display. Another object of the present invention is to provide a liquid crystal display provided with such back light.

A back light according to one aspect of the present invention is provided with a light source, light guide plate, reflection sheet and frame. The light guide plate collects light from the light source and has grooves in one surface. The reflection sheet is arranged in vicinity of one surface of the light guide plate and emits the collected light from the other surface of the light guide plate. The frame is arranged on the side of one surface of the light guide plate and supports the light source, light guide plate and reflection sheet. Provided between one surface of the light guide plate with grooves and the reflection sheet is a sheet with protrusions.

In the structure, the sheet with protrusions is provided in direct contact with the grooves of the light guide plate, so that damage to the surface with grooves (grooved surface) of the light guide plate is prevented. In addition, as the grooved surface does not catch the sheet with protrusions, the luminous dot phenomenon is prevented.

A back light according to the second aspect of the present invention is provided with a light source, light guide plate, reflection sheet and frame. The light guide plate collects light from the light source and has grooves in one surface. The reflection sheet is arranged in vicinity of one surface of the light guide plate and emits the collected light from the other surface of the light guide plate. The frame is arranged on the side of one surface of the light guide plate and supports the light source, light guide plate and reflection sheet. The reflection sheet is provided with protrusions.

In the structure, the reflection sheet with protrusions is in direct contact with the grooves of the light guide plate, so that damage to the grooved surface of the light guide plate is prevented. In addition, as the grooved surface does not catch the reflection sheet, luminous dot phenomenon is prevented.

Preferably, the frame supports a portion of the light guide plate which is outside a prescribed light emitting region. More specifically, a portion of the frame positioned near a periphery of the prescribed light emitting region has a step or chamfer.

In this case, even if the luminous dot phenomenon is caused at the portion supported by the frame, as the portion is positioned outside, the problem associated with display is avoided.

A liquid crystal display according to the third aspect of the present invention is provided with a light source, light guide plate, reflection sheet, liquid crystal panel and frame. The light guide plate collects light from the light source and has grooves in one surface. The reflection sheet is arranged on the side of one surface of the light guide plate and emits the collected light from the other surface of the light guide plate. The liquid crystal panel is arranged on the side of the other surface of the light guide plate. The frame is arranged on the side of one surface of the light guide plate and supports the light source, light guide plate, reflection sheet and liquid crystal panel. A sheet with protrusions is arranged between one surface of the light guide plate with grooves and the reflection sheet.

In the structure, the sheet with protrusions is in direct contact with the grooves of the light guide plate, so that damage to the grooved surface of the light guide plate is prevented. In addition, as the grooved surface does not catch the sheet, the luminous dot phenomenon is not caused.

A liquid crystal display according to the fourth aspect of the present invention is provided with a light source, light guide plate, reflection sheet, liquid crystal panel and frame. The light guide plate collects light from the light source and has grooves in one surface. The reflection sheet is arranged on the side of one surface of the light guide plate and emits the collected light from the other surface of the light guide plate. The liquid crystal panel is arranged on the side of the other surface of the light guide plate. The frame is arranged on the side of one surface of the light guide plate and supports the light source, light guide plate, reflection sheet and liquid crystal panel. The reflection sheet is provided with protrusions.

In the structure, the reflection sheet with protrusions is in direct contact with the grooves of the light guide plate, so that damage is not caused to the grooved surface of the light guide plate. In addition, as the grooved surface does not catch the reflection sheet, the luminous dot phenomenon is prevented.

Preferably, the frame supports a portion outside a liquid crystal display region for display of the liquid crystal panel. More specifically, the portion of the frame positioned near a periphery of the liquid crystal display region has a step or chamfer.

In this case, even if the luminous dot phenomenon is caused at the portion supported by the frame, as the portion is outside the liquid crystal display, the problem associated with display is avoided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
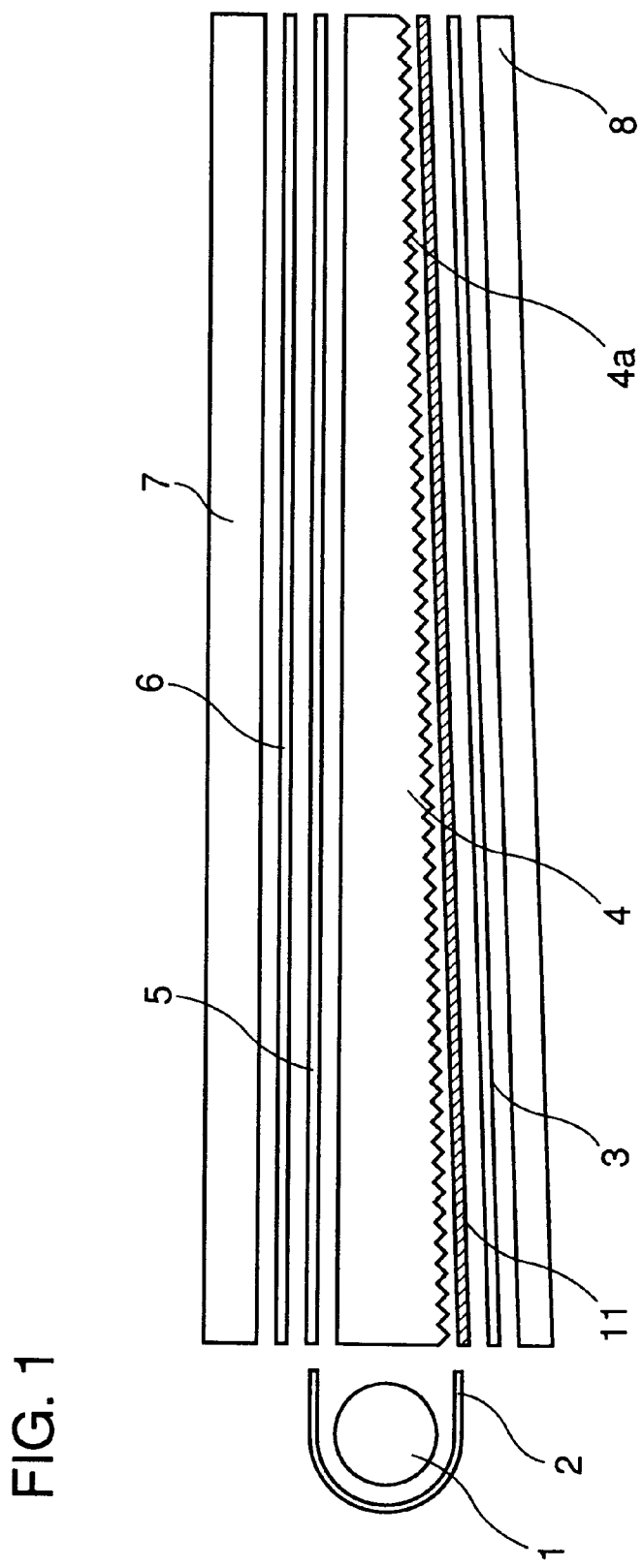
FIG. 1 is a cross sectional view showing a structure of a back light according to a first embodiment.

FIG. 1 is a cross sectional view showing a structure of a back light (or a liquid crystal display) according to the first embodiment. The back light includes a reflection sheet 3 and a frame 8 below a light guide plate 4 having a light collecting effect. A tubular light source 1 is arranged near the end surface (edge) of light guide plate 4. A reflector 2 is arranged to surround tubular light source 1. A sheet 5 having a light collecting effect and a sheet 6 having a light diffusing effect are arranged above light guide plate 4. A liquid crystal on panel 7 is arranged thereabove. A lens like grooved surface 4a having the light collecting effect is provided at the bottom of light guide plate 4. Reflection sheet 3 has a thickness of about 150 μm and its surface is white.

The back light differs from the conventional back light in that a transparent sheet or plate like member with protrusions is provided between lens like grooved surface 4a of light guide plate 4 having the light collecting effect and reflection sheet 3.

More specifically, embossed sheet 11 is used as the sheet with protrusions. Polyethylene terephthalate (hereinafter abbreviated as PET) is for example used as a material of sheet 11. As embossed sheet 11, for example, PC-ES produced by Kimoto Co., Ltd. is employed. The sheet is transparent and 100 μm in thickness. Any sheet other than that of PET may be used as long as the sheet is transparent and has protrusions.

Figure 2:
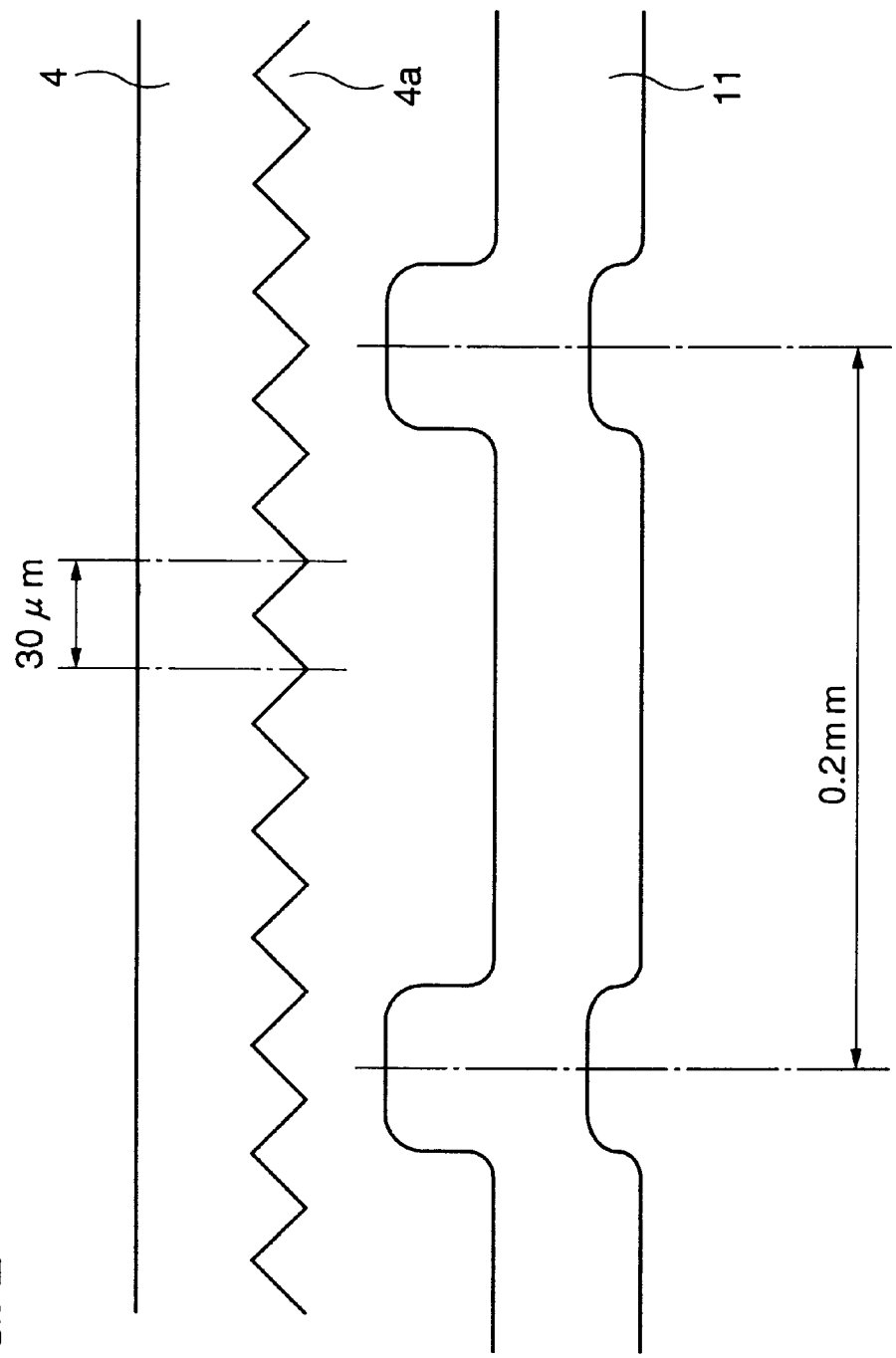
FIG. 2 is a diagram shown in conjunction with a relation between a pitch of a protrusion and that of lens like grooved surface 4a of light guide plate 4.

As shown in FIG. 2, a pitch of the embossed protrusions is about 0.2 mm and the protrusion is in the shape of a small column. A pitch of the groove of lens like grooved surface 4a of light guide plate is about 30 μm and the groove is in a triangular shape. As the pitches of the protrusion and groove are different, the contact area of reflection sheet and lens like grooved surface 4a is reduced and lens like grooved surface 4a of light guide plate 4 and reflection sheet 3 are not in close contact with each other.

Provision of embossed transparent sheet 11 between lens like grooved surface 4a of light guide plate 4 and reflection sheet 3 prevents damage to lens like grooved surface 4a and prevents reflection sheet 3 from being caught by lens like grooved surface 4a, so that the luminous dot phenomenon associated with display is prevented.

It is noted that the cross section of lens like grooved surface 4a is not particularly limited to the triangular or wave shape. In addition, characteristics of lens like grooved surface 4a, including a vertical angle, interval, height or the like, as well as a positional relation with respect to the light source and liquid crystal display, are not particularly limited. Further, the protrusion is not limited to a column, and may be a cone or hemisphere.

The grooves of lens like grooved surface 4a refer to grooves between lenses in stripe pattern provided in the light guide plate and those between lenses in dotted pattern provided in the light guide plate. In particular, provision of sheet 11 with respect to the grooves between the lenses in the stripe shape effectively prevents the above described problem associated with catching of the sheet by the grooves or luminous dot phenomenon.

Second Embodiment

Figure 3:
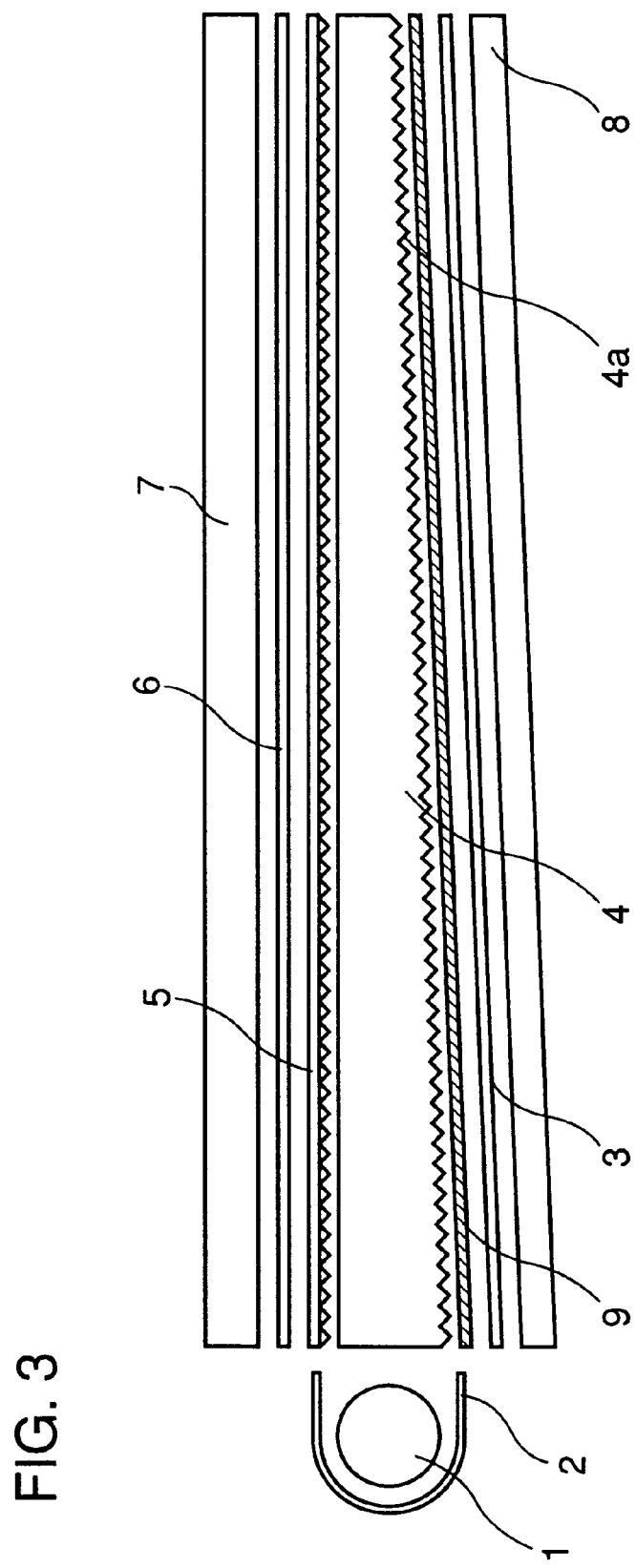
FIGS. 3 to 8 are cross sectional views respectively showing structures of back lights according to second to seventh embodiments.

FIG. 3 is a cross sectional view showing a structure of a back light (or a liquid crystal display) according to the second embodiment. The second embodiment is different from the back light of the first embodiment in that a transparent sheet having a certain degree of stiffness is provided between lens like grooved surface 4a having the light collecting effect and reflection sheet; 3.

PET is for example used as a material of transparent sheet 9 having a certain degree of stiffness. Any material other than PET may be used as long as it has the above mentioned function. More specifically, a sheet which has a stiffness higher than a reflection sheet RW 125 (having a thickness of 125 μm) produced by Kimoto Co. may be used.

Provision of transparent sheet 9 having a certain degree of stiffness between lens like grooved surface 4a of light guide plate 4 and reflection sheet 3 prevents damage to lens like grooved surface 4a and prevents lens like grooved surface 4a from catching reflecting sheet 3. Thus, the luminous dot phenomenon associated with display is prevented.

Third Embodiment

Figure 4:
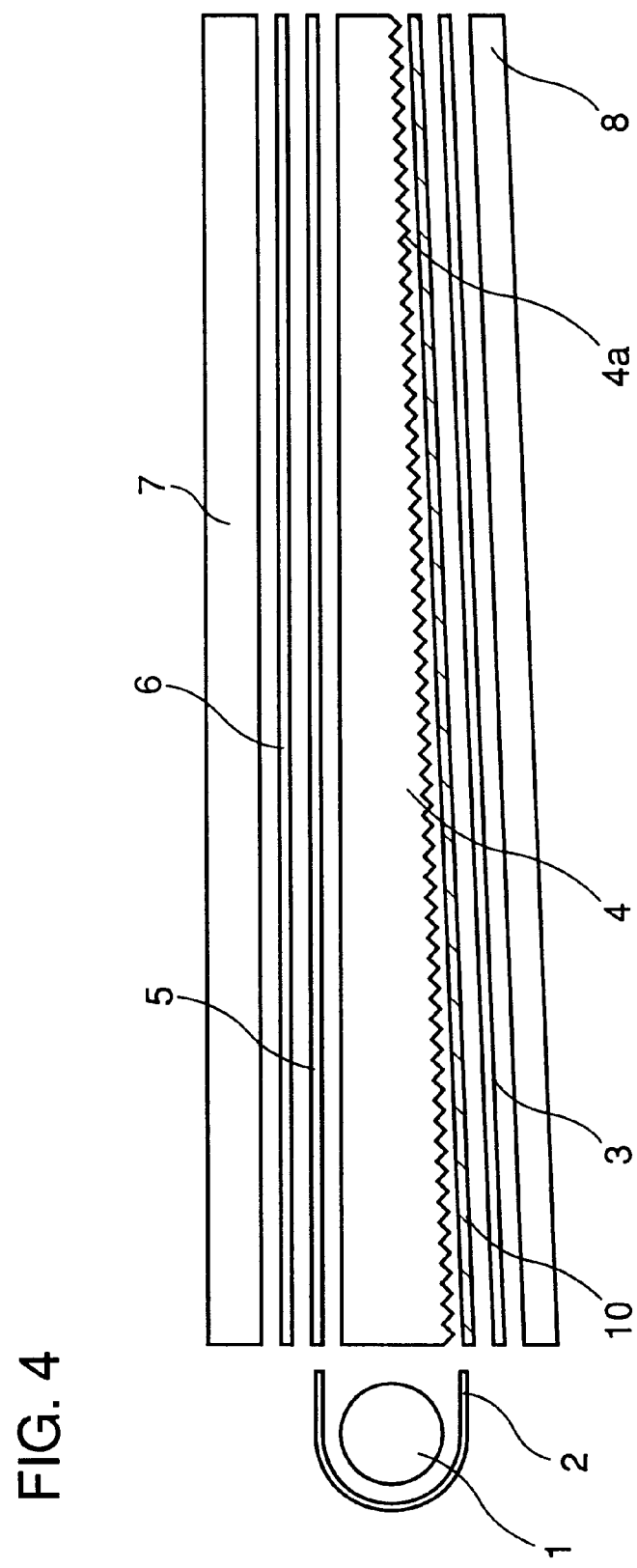

FIG. 4 is a cross sectional view showing a structure of a back light (or a liquid crystal display) according to the third embodiment. The back light of the third embodiment is different from that of the first embodiment in that a transparent sheet 10 having a light diffusing effect is provided between lens like grooved surface 4a having a light collecting effect and reflection sheet 3.

A sheet 100TL produced by Kimoto Co. is for example used as transparent sheet 10 having the light diffusing effect. The sheet is transparent, has a thickness of 100 μm and includes PET with bead coatings on either side. The bead coating is preferably of a particle type for diffusion of light and may include material.

Use of sheet 10 effectively reduces the contact area with lens like grooved surface 4a. The sheet is not limited to sheet 100TL, and any material may be used as long as it has the above mentioned function.

Provision of transparent sheet 10 having the light diffusing effect between lens like grooved surface 4a of light guide plate 4 and reflection sheet 3 prevents damage to lens like grooved surface 4a and prevents lens like grooved surface 4a from catching reflection sheet 3. Thus, the luminous dot phenomenon associated with display is prevented.

Fourth Embodiment

Figure 5:
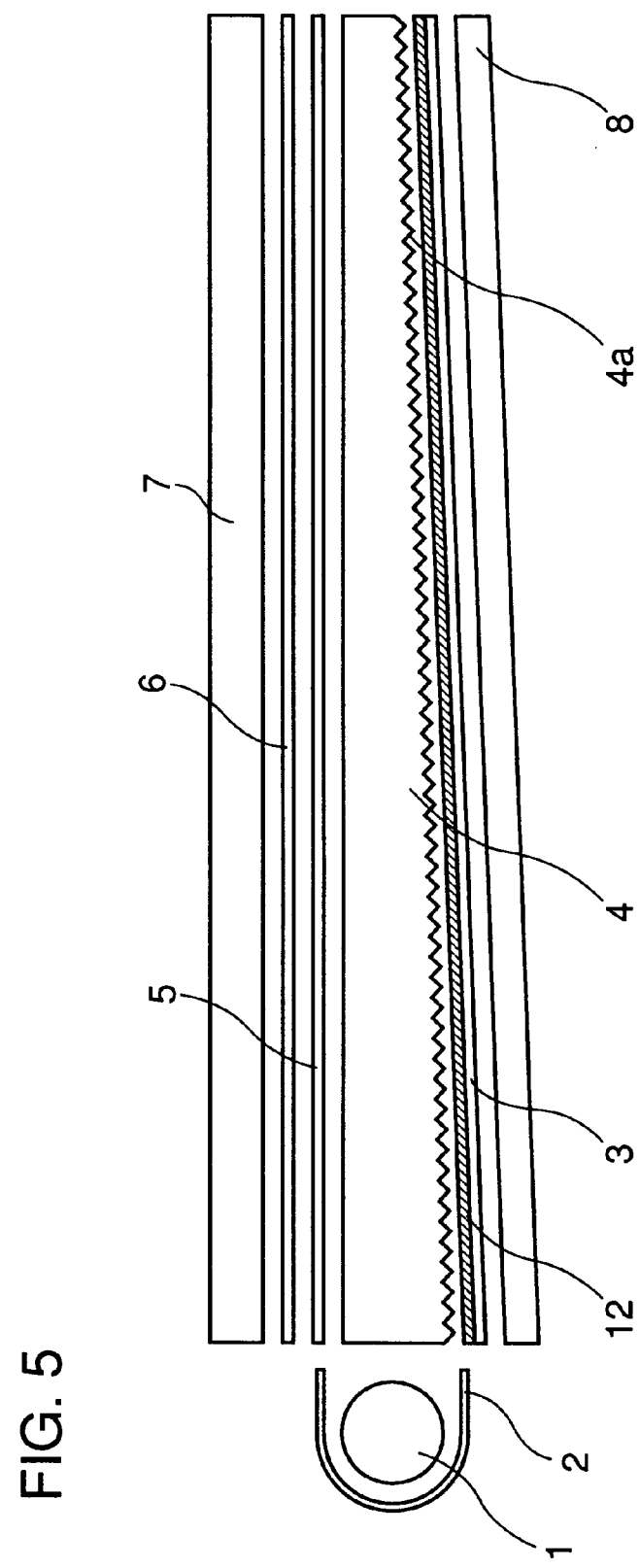

FIG. 5 is a cross sectional view showing a structure of a back light (or a liquid crystal display) of the fourth embodiment. In the back light, a sheet 12, which is one of the sheets described in the first to third embodiments, adheres to reflection sheet 3. A material with high transmittance is selected for adhesion. In addition to the effects described in the first to third embodiments, the back light of the present embodiment produces an effect that efficiency in assembly operation is increased as the number of sheets does not increase.

Fifth Embodiment

Figure 6:
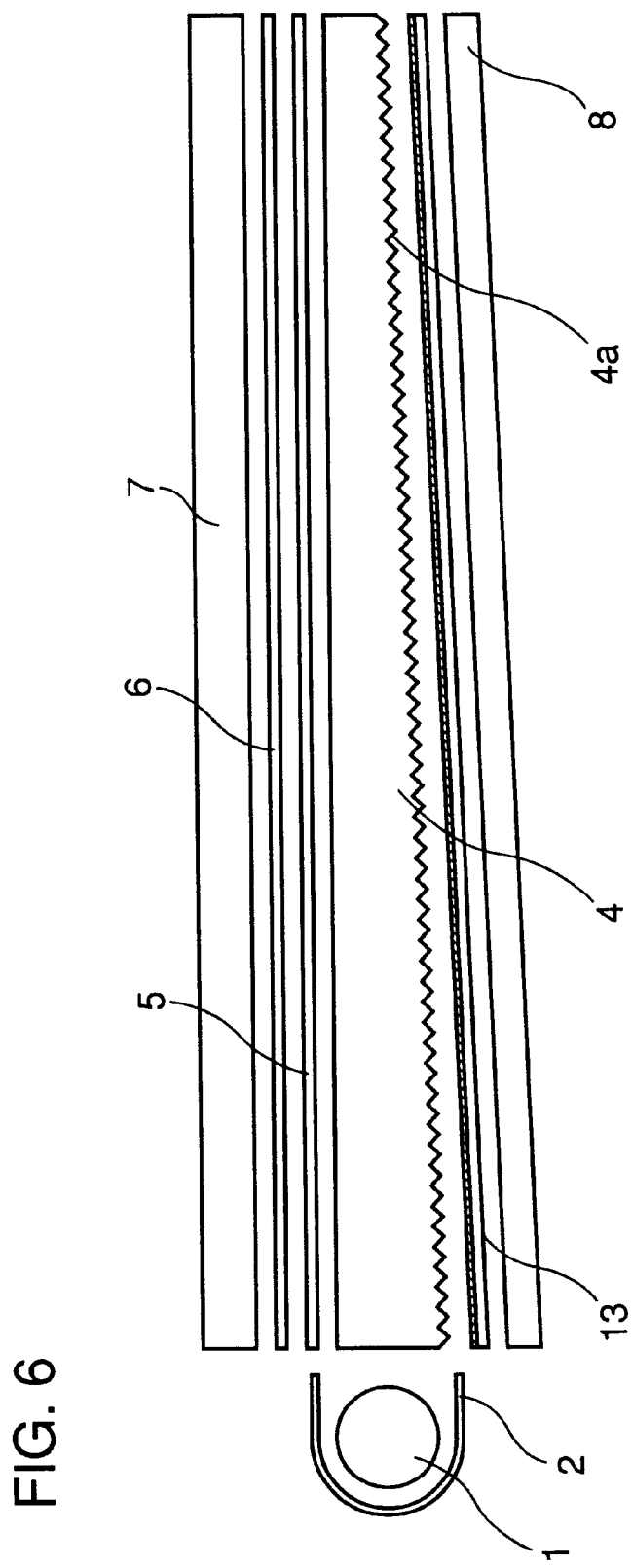

FIG. 6 is a cross sectional view showing a structure of a back light (or a liquid crystal display) according to the fifth embodiment. The back light of the fifth embodiment is different from that of the first embodiment in that a reflection sheet 13 provided with protrusions and a reflecting function is arranged on the side of lens like grooved surface 4a. The shape of the protrusion is the same as that of sheet 11 of the back light according to the first embodiment.

The protrusions are formed by an emboss processing. Preferably, a sheet based on embossed reflection sheet RW 188 or RW 125, produced by Kimoto Co., is used. Sheets RW 188 and RW 125 respectively have thicknesses of 188 μm and 125 μm, both having white surfaces. Any sheet having the above described function may be employed.

Provision of the protrusions on the side of lens like grooved surface 4a of light guide plate 4 and sheet 13 having the reflecting function makes pitches of the protrusions of sheet 13 and lens like grooved surface 4a different, so that the contact area of lens like grooved surface 4a decreases.

Accordingly, damage is not caused to lens like grooved surface 4a and lens like grooved surface 4a is prevented from catching reflection sheet 13. Thus, the luminous dot phenomenon associated with display is prevented. In addition, efficiency in the assembly operation increases as the number of sheets is not increased. Furthermore, reduction in the number of sheets reduces the overall thickness of the liquid crystal display.

Sixth Embodiment

Figure 7:
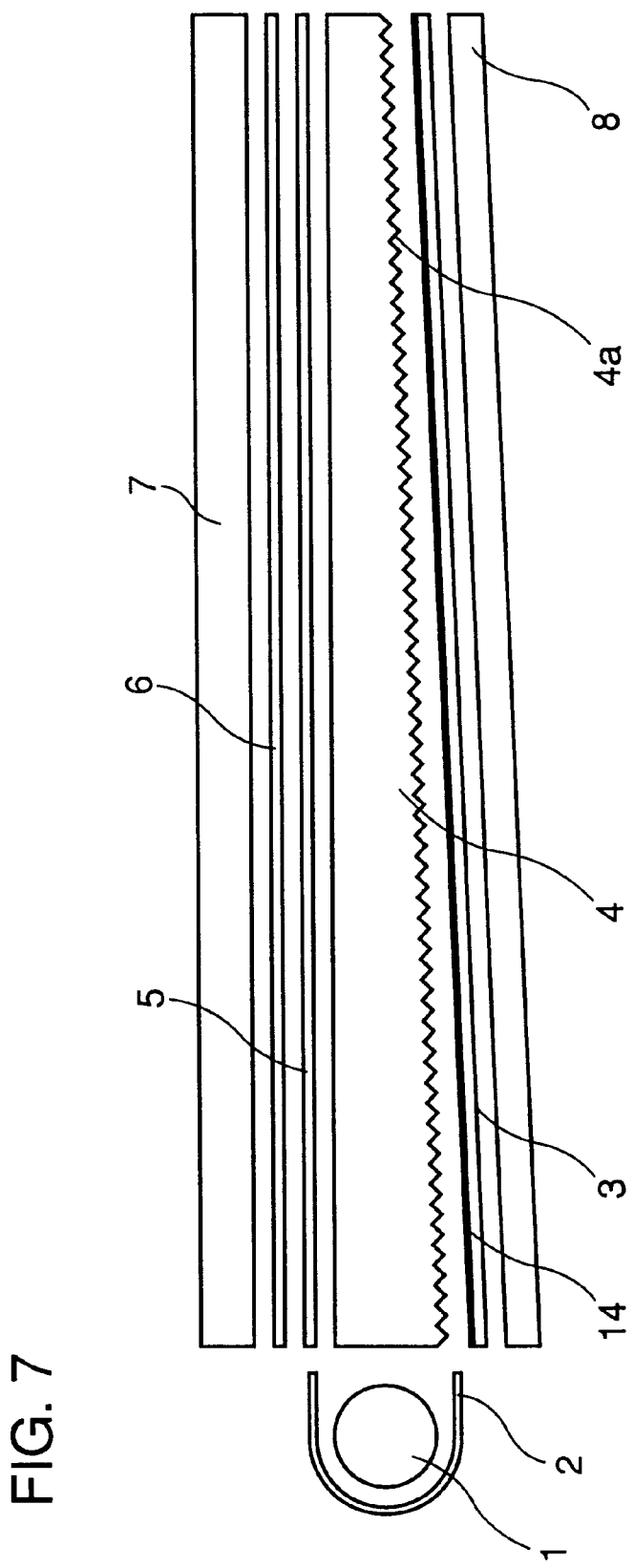

FIG. 7 is a cross sectional view showing a structure of a back light (or a liquid crystal display) of the sixth embodiment. The back light of the sixth embodiment is different from that of the first embodiment in that a transparent coating 14 is applied to the surface of reflection sheet 3 on the side of lens like grooved surface 4a.

Preferably, sheet BS-01 or BS-03 produced by Keiwa Shoukou Co. with a coating is used. It is noted that the coating is not limited to this as long as it has the above mentioned function.

Transparent coating 14 on reflection sheet 3 below lens like grooved surface 4a of light guide plate 4 prevents damage to lens like grooved surface 4a and prevents lens like grooved surface 4a from catching reflection sheet 3. Thus, the luminous dot phenomenon associated with display is prevented. Further, efficiency in the assembly operation increases as the number of sheets is not increased.

Seventh Embodiment

Figure 8:
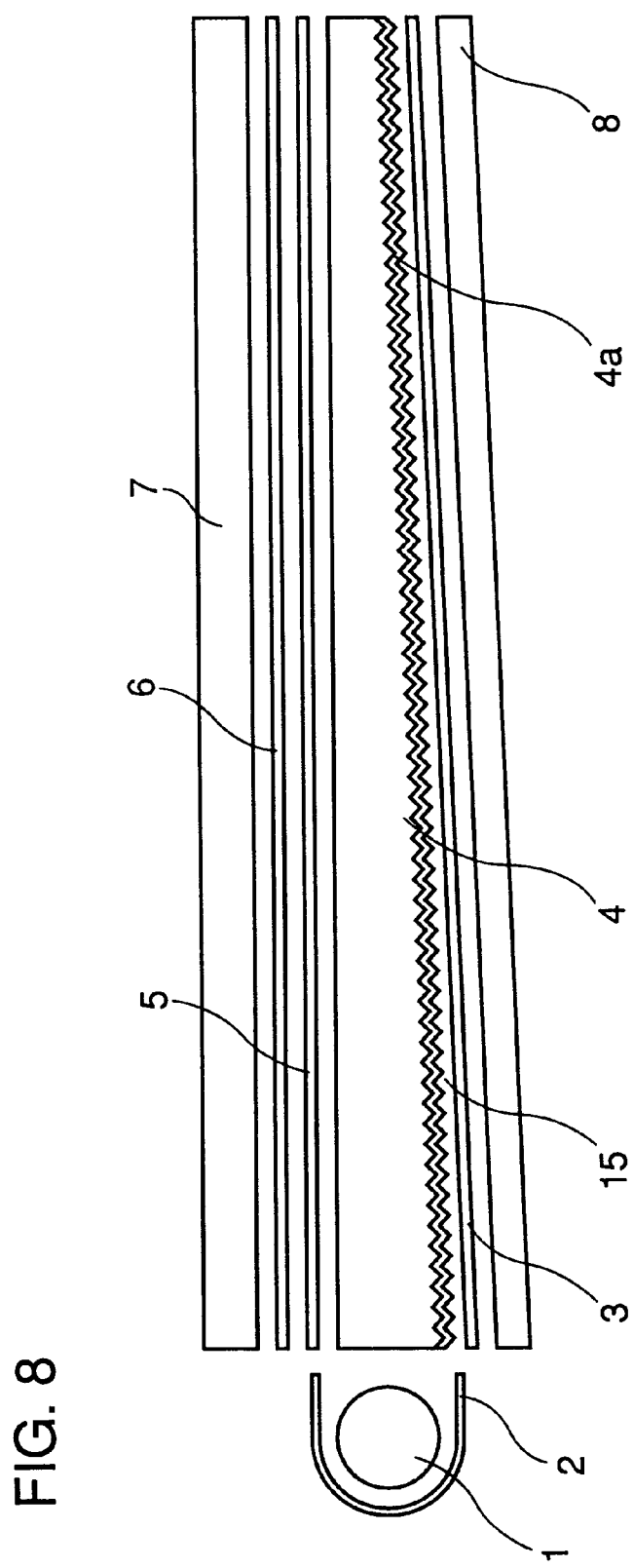

FIG. 8 is a cross sectional view showing a back light (or a liquid crystal display) of the eighth embodiment. The back light of the eighth embodiment is different from that of the sixth embodiment in that a transparent coating 15 is applied to the surface of lens like grooved surface 4a of light guide plate 4. For example, although not limited, $SiO_2$ is used for the coating. In addition, coating 15 is not limited to a transparent coating.

Application of transparent coating 15 on the surface of lens like grooved surface 4a of light guide plate 4 prevents damage to lens like grooved surface 4a and prevents lens like grooved surface 4a from catching reflection sheet 3. Thus, the luminous dot phenomenon associated with display is prevented. Further, efficiency in assembly operation increases as the number of sheets is not increased.

Eighth Embodiment

Figure 9A:
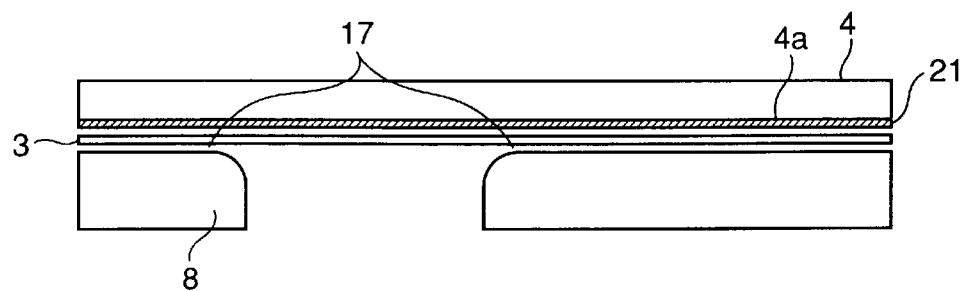
FIG. 9A is a cross sectional view showing a structure of a back light according to an eighth embodiment taken along the line 9A—9A shown in FIG. 9B.
Figure 9B:
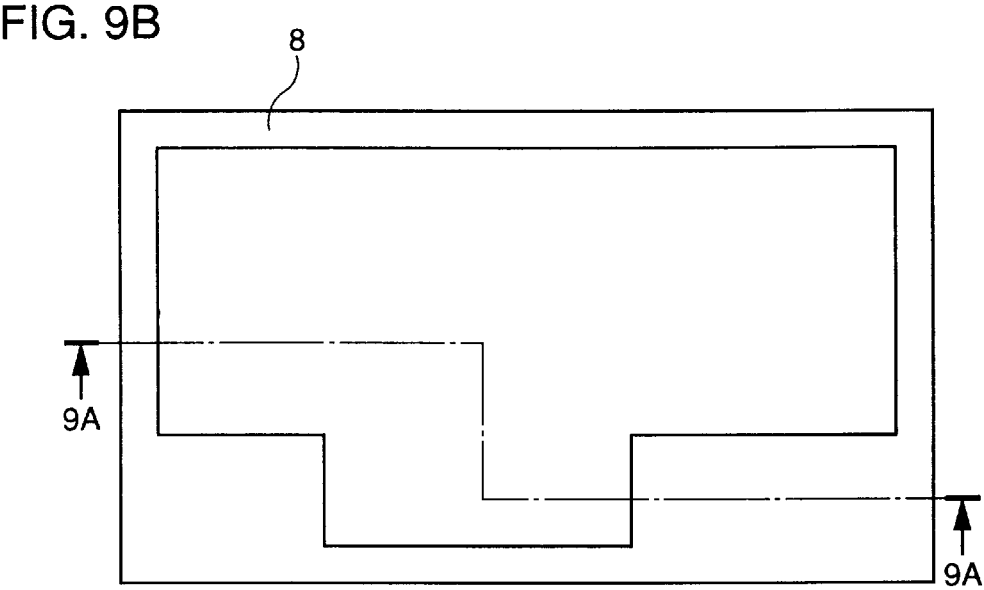
FIG. 9B is a top view showing a structure of a frame shown in FIG. 9A.

FIGS. 9A and 9B are cross sectional views showing structures of a back light (or a liquid crystal display) according to the eighth embodiment. FIG. 9A shows a cross section taken along the line 9A—9A of frame 8, and FIG. 9B shows a top view of frame 8.

As in the case of the conventional back light, frame 8 supporting light guide plate 4 is provided with an opening. A sheet or coating 21, which has been described in the first to seventh embodiments, is applied on the side of lens like grooved surface 4a of light guide plate 4. If the portion in the vicinity of a boundary of the liquid crystal area or a portion of frame 8 is within a liquid crystal display area, a chamfer 17 in an arc shape is formed inside frame 8 on the side of lens like grooved surface 4a.

Unlike a chamfer in the arc shape (R0.2 mm to R0.3 mm) generally formed by molding, a chamfer in an arc shape, which is as large as possible in terms of design, is intentionally formed. For example, in frame 8, the chamfer is R1 mm at a portion having a thickness of 1.1 mm. The chamfer is not limited to the arc shape, and any shape without a corner may be employed.

Provision of chamfer 17 in the arc shape in frame 8 prevents damage to lens like grooved surface 4a in a display area and prevents lens like grooved surface 4a from catching reflection sheet 3. Thus, the luminous dot phenomenon associated with display is prevented.

Ninth Embodiment

Figure 10A:
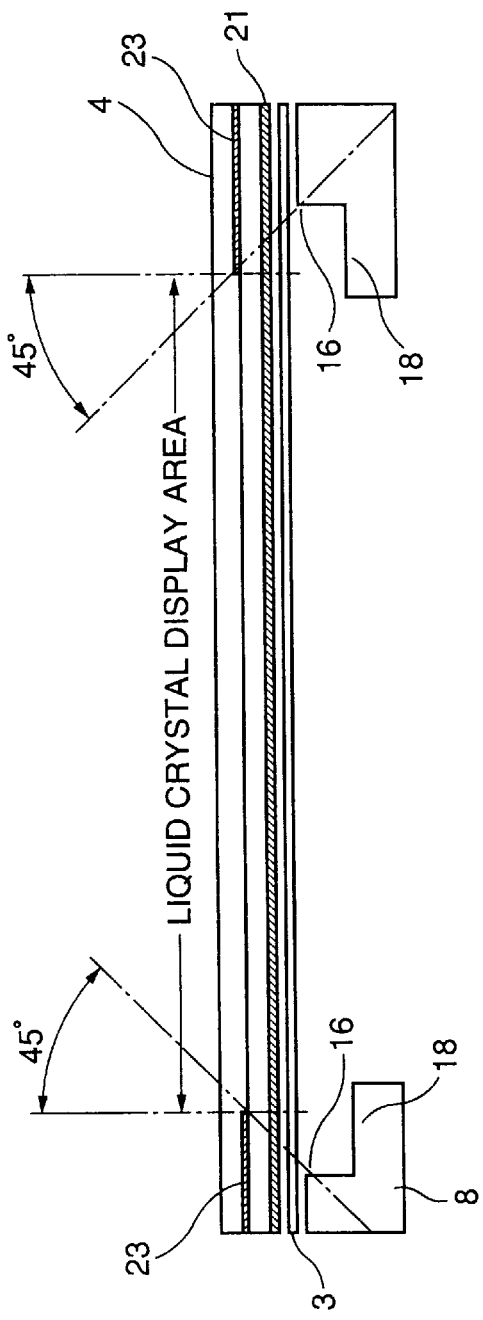
FIG. 10A is a cross sectional view showing a structure of a back light according to a ninth embodiment.

FIG. 10A is a cross section view showing a structure of a back light (or a liquid crystal display) of the ninth embodiment of the present invention. For frame 8 supporting light guide plate 4, when a boundary between a light shielding film 23 and a liquid crystal area is viewed at a viewing angle of 45°, a step 18 is provided inside frame 8 and outside the viewing angle 45°.

Figure 10B:
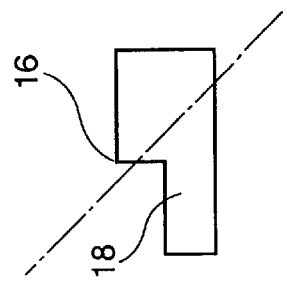
FIG. 10B is a cross sectional view showing a structure of a frame shown in FIG. 10A.
Figure 10C:
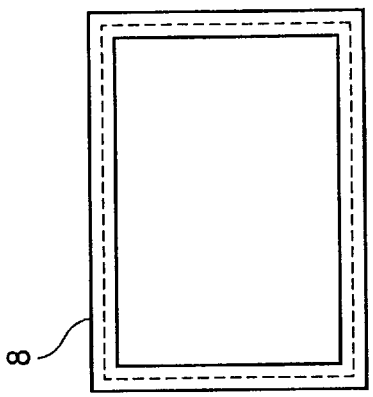
FIG. 10C is a top view showing a structure of the frame shown in FIG. 10A.

As shown in FIG. 10B, an edge 16 may be positioned outside the viewing angle of 45°. Step 18 is in a shape defining an opening with an upper portion larger than a lower portion. The direction of the viewing angle of 45° corresponds to the direction of the largest viewing angle when viewing the liquid crystal display. The shape of frame 8 is shown in FIG. 10C. If a portion of frame 8 is within the liquid crystal display area, the shapes shown in FIGS. 9 and 12 may be employed.

Step 18 of frame prevents damage to lens like grooved surface 4a and prevents lens like grooved surface 4a from catching reflection sheet 3, so that the luminous dot phenomenon associated with display is prevented.

Further, even if the luminous dot phenomenon is caused at edge 16 on the side of lens like grooved surface 4a of step 18 of frame 8, the luminous dot phenomenon does not affect display as edge 16 is outside the liquid crystal display area. Therefore, the problem associated with display is not caused.

Tenth Embodiment

Figure 11:
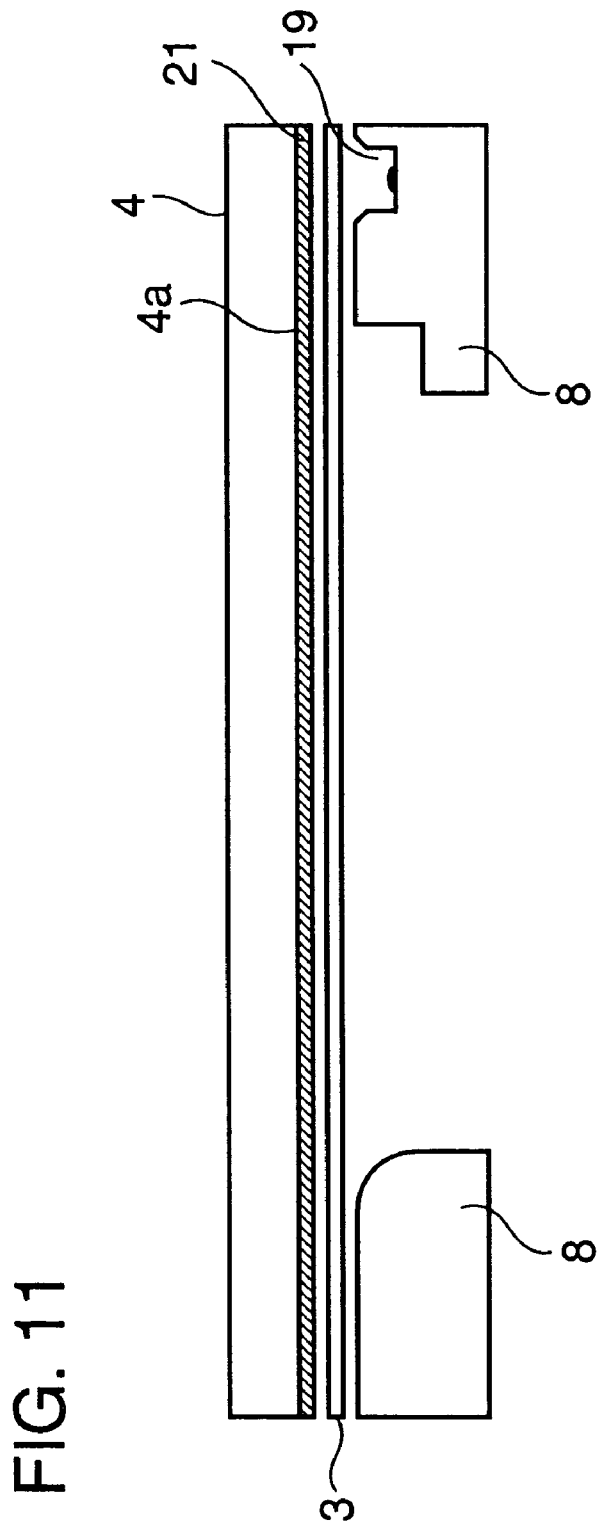
FIGS. 11 and 12 are cross sectional views respectively showing structures of back lights according to tenth and eleventh embodiments.

FIG. 11 is a cross sectional view showing a structure of a back light (or a liquid crystal display) of the tenth embodiment. A recess is provided around a protrusion 19 by a pin of frame 8 or a protrusion by a gate pin caused during manufacture, so that the protrusion is not brought into contact with lens like grooved surface 4a of light guide plate 4. Protrusion 19 by a pin or the protrusion by the gate pin is not limited to this as long as it is not brought into contact with lens like grooved surface 4a. With such a structure, damage to lens like grooved surface 4a is prevented.

Eleventh Embodiment

Figure 12:
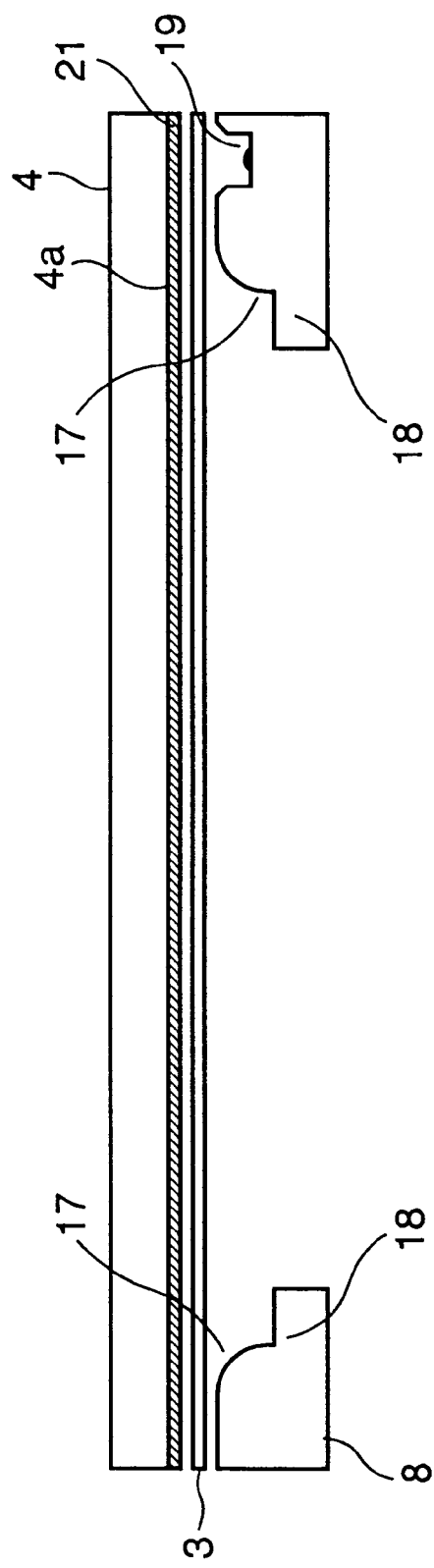
Figure 13:
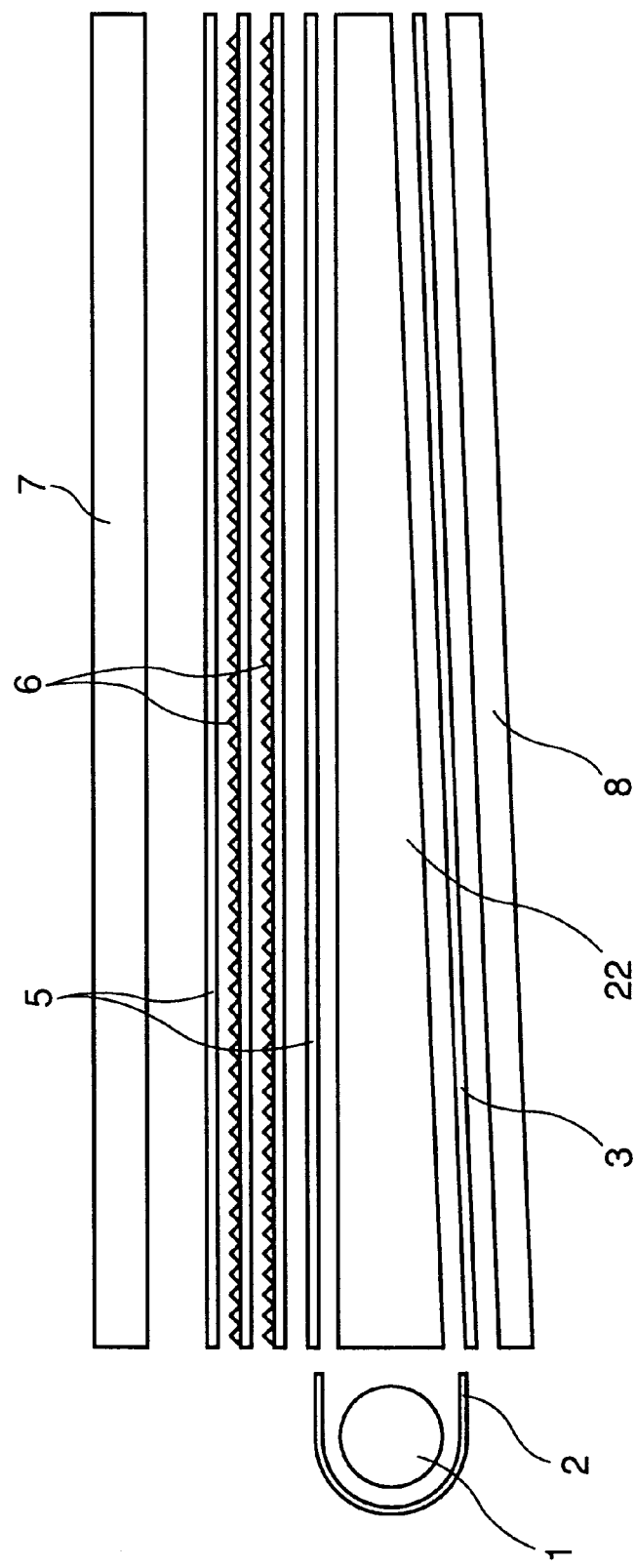
FIG. 13 is a cross sectional view showing a structure of a conventional first back light (including four sheets).
Figure 14:
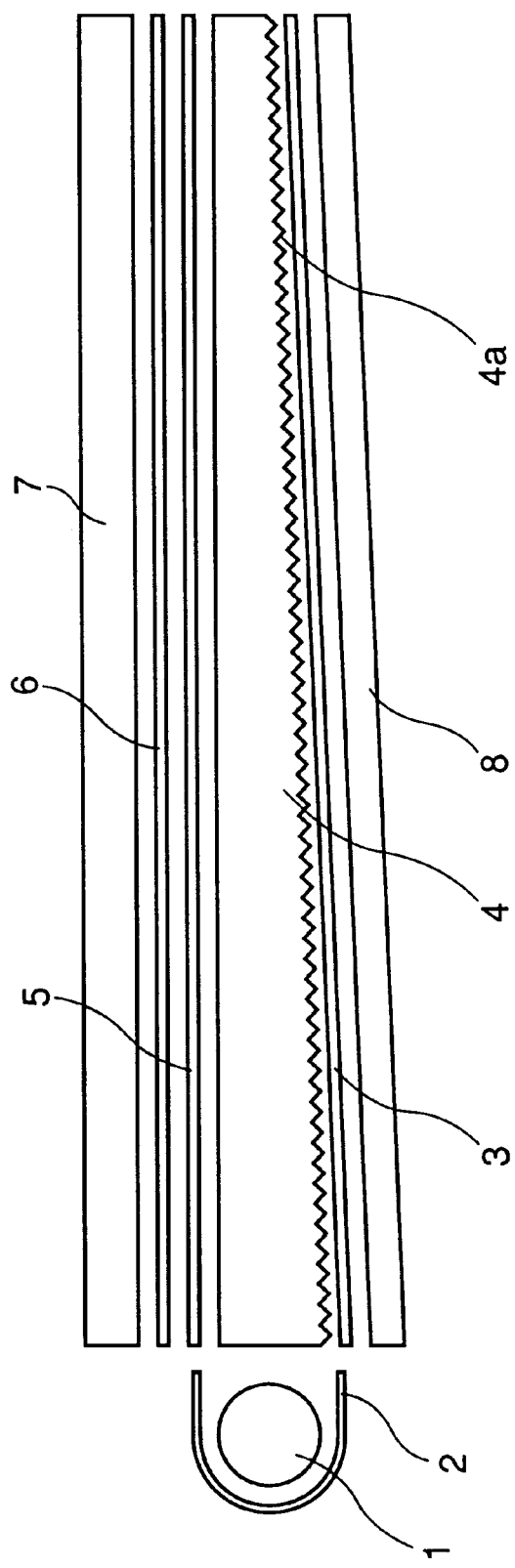
FIG. 14 is a cross sectional view showing a conventional second back light (including two sheets).
Figure 15A:
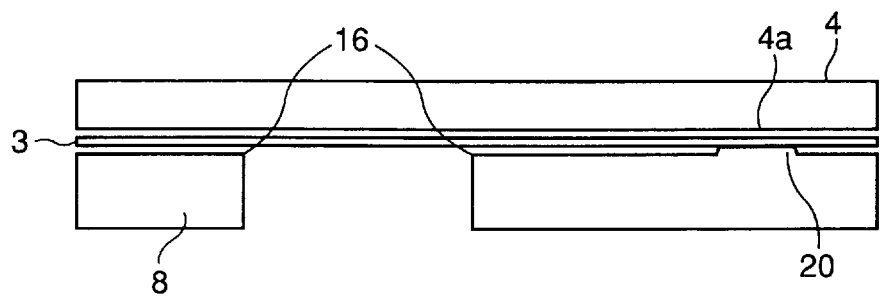
FIG. 15A is a cross sectional view showing a structure of a conventional back light taken along the line 15A—15A shown in FIG. 15A.
Figure 15B:
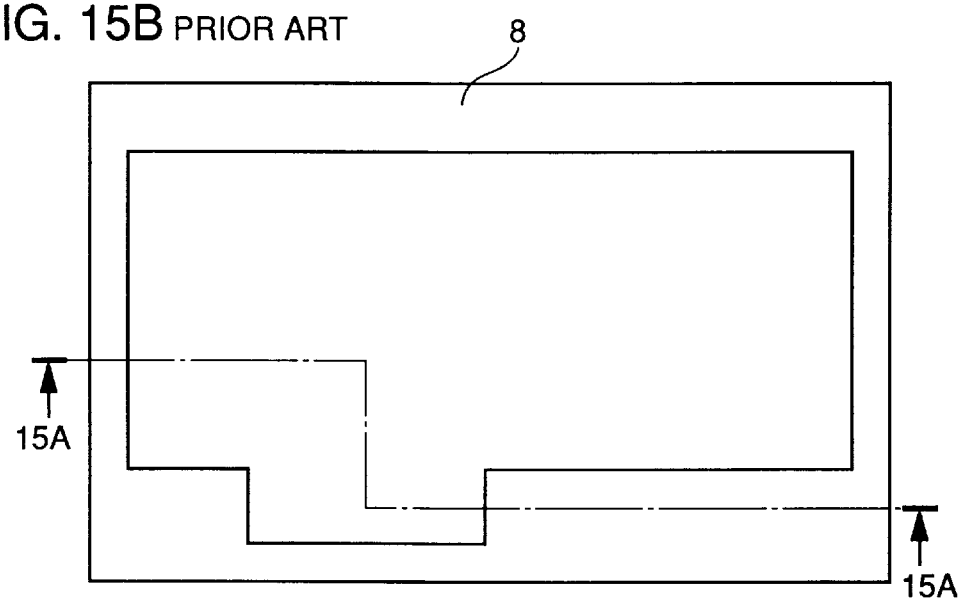
FIG. 15B is a top view showing a structure of a frame of the conventional back light.

FIG. 12 is a cross sectional view showing a structure of a back light (or a liquid crystal display) of the eleventh embodiment. The back light is a combination of the structures of frame 8 described in the eighth to tenth embodiments.

The combination of structures of frame 8 also produces an effect similar to those described in the eighth to tenth embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A back light comprising:
   a light source;
   a light guide plate collecting light from said light source and having at least one groove in one surface for emitting light in one direction;
   a reflection sheet arranged in vicinity of said one surface of said light guide plate, and wherein light is emitted from another surface of said light guide plate;
   a frame arranged on a side of said one surface of said light guide plate for supporting said light source, said light guide plate, and said reflection sheet; and
   protecting means for preventing said reflection sheet from being brought into contact with and caught by said groove of said light guide plate, said protecting means located at least partially at a boundary between said one surface of said light guide plate with said groove and said reflection sheet.

2. The back light according to claim 1, wherein said protecting means is a sheet with protrusions.

3. The back light according to claim 1, wherein said preventing means is a sheet having a stiffness.

4. The back light according to claim 1, wherein said preventing means is a sheet with protrusions applied to a surface on a side of said groove of said reflection sheet.

5. The back light according to claim 1, wherein said protecting means is a sheet with a stiffness applied to a surface on a side of said groove of said reflection sheet.

6. The back light according to claim 1, wherein said protecting means is a protrusion provided on a surface of said reflection sheet on a side of said groove.

7. The back light according to claim 1, wherein said protecting means is a coating formed on a surface of said groove of said light guide plate or on a surface of said reflection sheet.

8. The back light according to claim 1, wherein said frame supports a portion outside a prescribed light emitting region of said light guide plate and said frame is used as said protecting means.

9. The back light according to claim 3, wherein said portion of said frame positioned in vicinity of a periphery of said prescribed light emitting region has a step or a chamfer.

10. A liquid crystal display, comprising:
    a light source;
    a light guide plate collecting light from said light source and having at least one groove in one surface thereof, said light guide plate for uniformly emitting light in one direction;

a reflection sheet arranged in a vicinity of said one surface of said light guide plate;

a frame arranged on a side of said one surface of said light guide plate for supporting said light source, said light guide plate, and said reflection sheet; and protecting means for preventing said reflection sheet from being brought into contact with and caught by said groove, said groove protecting means at least partially located at a boundary between said one surface of said light guide plate with said groove and said reflection sheet.

11. The liquid crystal display according to claim 10, wherein said protecting means is a sheet with protrusions.

12. The liquid crystal display according to claim 10, wherein said protecting means is a sheet having a stiffness.

13. The liquid crystal display according to claim 10, wherein said protecting means is a sheet with protrusions applied to a surface on a side of said groove of said reflection sheet.

14. The liquid crystal display according to claim 10, wherein said protecting means is a sheet having a stiffness applied to a surface on a side of said groove of said reflection sheet.

15. The liquid crystal display according to claim 10, wherein said protecting means is a protrusion on a surface of said reflection sheet on a side of said groove.

16. The liquid crystal display according to claim 10, wherein said protecting means is a coating formed on a surface of said groove of said light guide plate or on a surface of said reflection sheet.

17. The liquid crystal display according to claim 10, wherein said frame supports a portion outside a display region of said liquid crystal panel and said frame is used as said protecting means.

18. The liquid crystal display according to claim 17, wherein said portion of said frame positioned in vicinity of a periphery of said liquid crystal display region has a step or a chamfer.

19. The back light of claim 1, wherein a pitch of protrusions of said protecting means is greater than a pitch of grooves in said one surface of said light guide plate.

20. The liquid crystal of display according to claim 10, wherein a pitch of protrusions of said protecting means is greater than a pitch of grooves in said one surface of said light guide plate.

21. A back light for a display, the back light comprising:

a light source;

a light guide plate collecting light from said light source and having a plurality of grooves in one surface thereof, where light is to be emitted from said light guide plate toward a display panel;

a reflection sheet arranged in vicinity of said one surface of said light guide plate; and protecting means for preventing said reflection sheet from being brought into contact with and caught by grooves of said light guide plate.

* * * * *